April 20, 1965 J. F. HALL, JR 3,179,802
RADIANT ENERGY ABSORPTION SYSTEM INCLUDING HEAT SINKS
FOR REMOVAL OF ENERGY FROM A SEPTUM
Filed Aug. 25, 1961 3 Sheets-Sheet 1
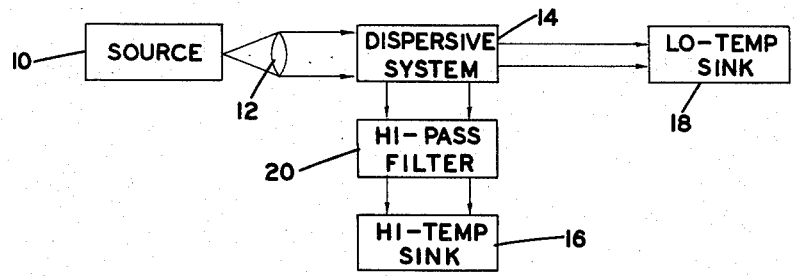
FIG. 1
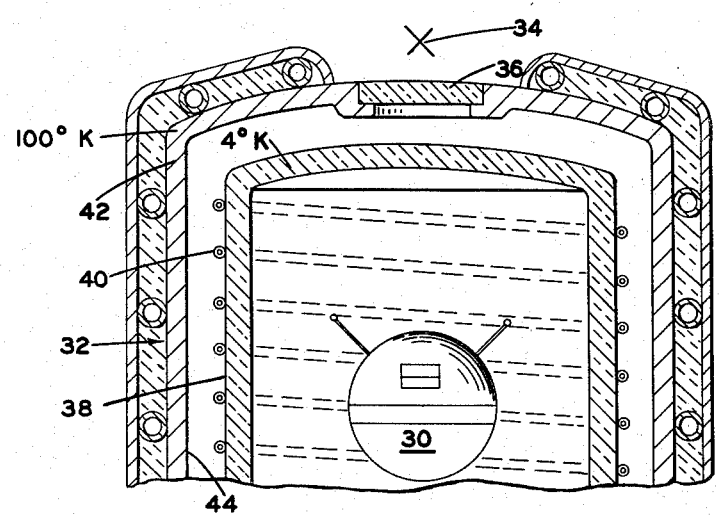
FIG. 2
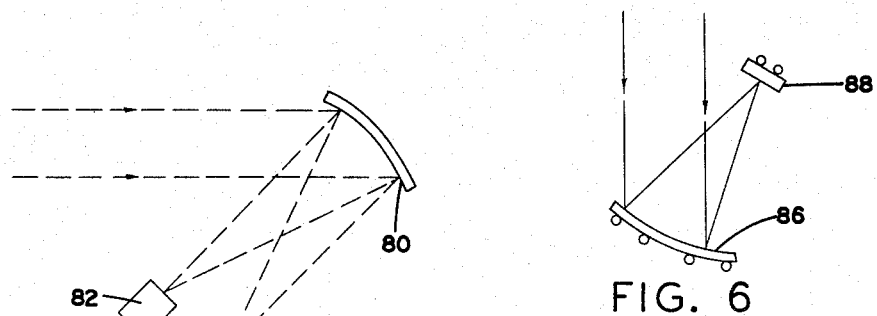
FIG. 5
FIG. 6
INVENTOR.
JOSEPH F. HALL, JR.
BY
ATTORNEYS

INVENTOR.
JOSEPH F. HALL, JR.
ATTORNEYS

United States Patent Office 3,179,802
Patented Apr. 20, 1965

3,179,802
RADIANT ENERGY ABSORPTION SYSTEM INCLUDING HEAT SINKS FOR REMOVAL OF ENERGY FROM A SEPTUM
Joseph F. Hall, Jr., Rochester, N.Y., assignor to Bausch & Lomb Incorporated, Rochester, N.Y., a corporation of New York
Filed Aug. 25, 1961, Ser. No. 133,969
14 Claims. (Cl. 250—83.3)

The present invention relates to an improved method of and apparatus for absorbing radiant energy, and is presently thought to have particular application to cryogenic systems wherein it is desired to remove energy from a radiating body which radiates energy over a relatively wide spectrum.

Ordinary cryogenic systems depend largely upon conduction for removing heat from articles to be cooled, but certain systems have been proposed that are dependent upon radiation alone such as, for example, devices intended to simulate conditions in outer space. In devices of this type, it is desired to place an object in an environment simulating the conditions to be met in outer space, including an extremely rarified atmosphere, a radiant energy heat sink at an effective temperature of about 4° K., or colder, and radiant energy sources simulating sunshine, earth light, and moon light. Relatively large amounts of energy are received by the object in the simulator device from the sunshine, earth light, and moon light simulating sources. Much of this energy is reflected by the object, but some is absorbed and serves to warm the object so that it radiates as an original source. The total energy coming from the object thus consists of both reflected and directly radiated energy, the reflected energy conforming largely to the spectral distribution of solar radiation. There is usually also a great deal of energy directed into the system that by-passes the test object and must be removed directly, as if it were passing on into empty space.

In order to simulate outer space conditions, the test object must "see" its surroundings as a radiant energy heat sink at 4° K. or colder. It is relatively expensive to maintain a heat sink at such a low temperature, particularly under space simulating conditions wherein relatively large amounts of energy are to be handled. Liquid helium, for example, is the only practical material available as a refrigerant for cooling such a heat sink. Not only is liquid helium in short supply and expensive, but the mechanical apparatus for handling it is also relatively expensive.

Accordingly, one important object of the present invention is to provide an improved method of and apparatus for absorbing radiant energy in a cryogenic system, whereby the demands upon the relatively low temperature refrigeration system are minimized, and relatively large proportions of the radiant energy are absorbed in heat sink maintained at a relatively high temperature.

The invention is not limited to this specific application, but is expected to find relatively wide use in many different fields, including fields dealing with relatively high temperature phenomena, especially in areas of testing and measuring. Accordingly, more general objects of the invention are to provide a novel method of extracting radiant energy from a system, and to provide a novel, plural-stage heat sink for absorbing radiation from a radiating source.

The foregoing and other objects and advantages of the invention will become apparent in the following detailed description of representative embodiments thereof, taken in conjunction with the drawing, wherein:

FIG. 1 is a schematic diagram illustrating the underlying principle of the invention;

FIG. 2 is a cross sectional view, in partly schematic form of an outer space simulating apparatus according to a first embodiment of the invention;

FIG. 5 is a schematic diagram illustrating one plural heat sink arrangement according to the invention;

FIG. 6 is a schematic diagram illustrating a second heat sink arrangement according to the invention;

Figure 3:
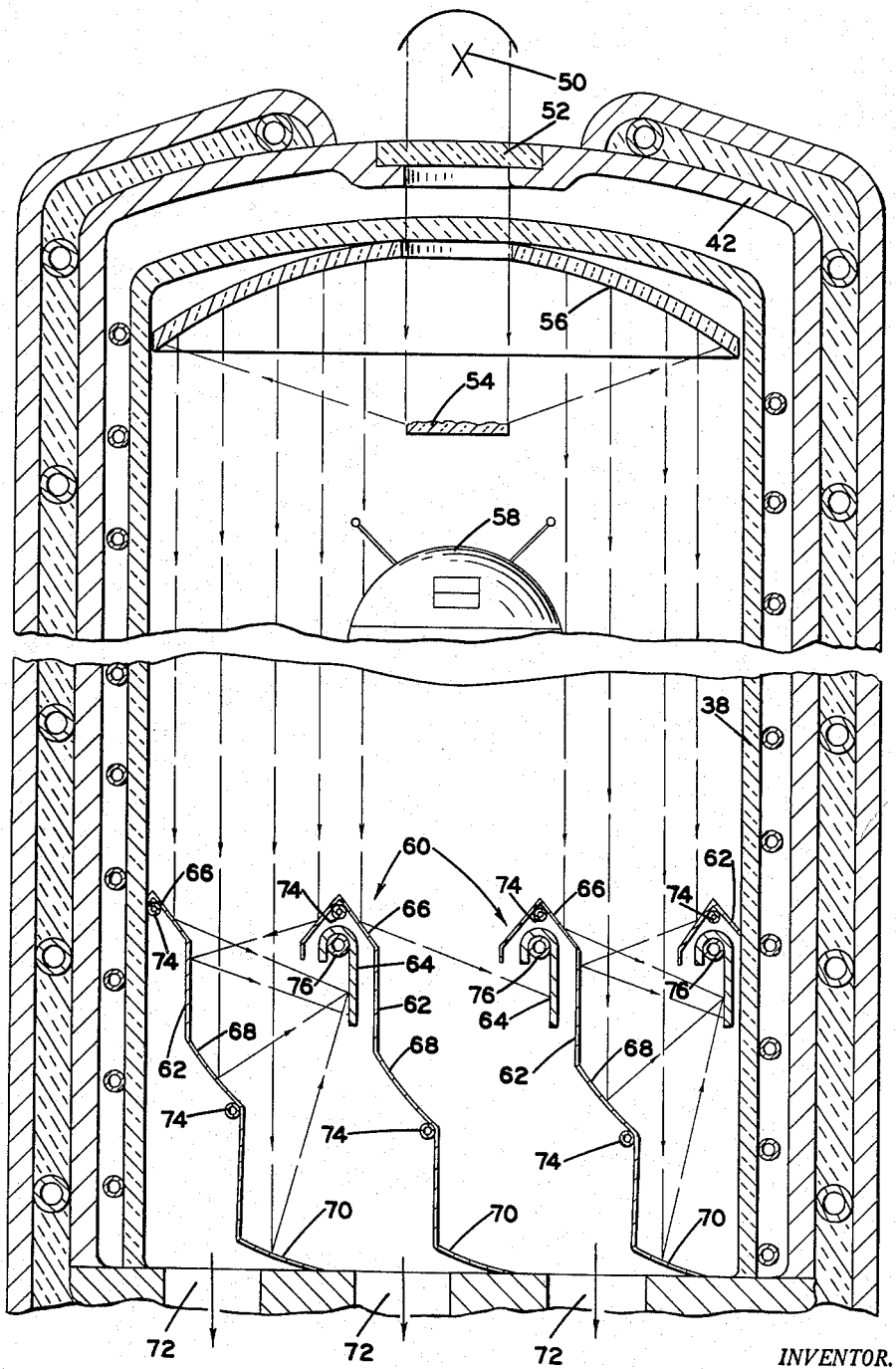
FIG. 3 is a cross sectional view, in partly schematic form of an outer space simulating apparatus according to another embodiment of the invention.

Briefly, the present invention contemplates the economic removal of radiant energy from a system by dividing the energy according to its effective temperature, that is, according to the energy contents of the individual quanta, or photons, directing the photons of relatively high energy content to a heat sink maintained at a relatively high temperature, and directing the relatively low energy photons to a heat sink maintained at a relatively low temperature. For maximum efficiency in the arrangement, the emissivity of the high temperature sink is made relatively low in the low energy portion of the spectrum, thereby minimizing transfer of radiation from the high temperature sink to the low temperature sink. As a result, the demands upon the low temperature sink are minimized, thus reducing the cost of operating it, and permitting economic removal of relatively large amounts of energy relatively rapidly.

Referring now to the drawings, the underlying principle of the invention is schematically represented in FIG. 1, wherein there is shown a source 10 of radiation having a relatively wide spectral distribution, and a device such as a collimating lens 12 for directing radiation from the source 10 toward a dispersive system 14. The dispersive system includes any desired means for separating relatively high energy photons from relatively low energy photons, and for directing the high energy photons toward a first sink 16, which is maintained at a relatively high temperature, and directing the relatively low energy photons toward a second sink 18, which is maintained at a relatively low temperature.

For optimum efficiency of operation, that is, to minimize the energy directed to the low temperature sink 18, a filter device 20 is arranged in the path between the dispersive system 14 and the high temperature sink 16. The filter 20 is selected to pass relatively high energy photons and to discriminate against relatively low energy photons, thereby minimizing the transfer of radiant energy from the high temperature sink 16 to the low temperature sink 18. The relatively high temperature sink 16 is preferably maintained at a temperature well below the equivalent temperature of the radiation it is designed to receive, so that its emission of energy toward the dispersive element 14 will not be appreciably large. Thus, in many instances, the filter 20 may be omitted, especially in those cases where the low temperature sink 18 is operated at a non-cryogenic temperature.

In working in cryogenic systems where the low temperature sink is maintained relatively close to absolute zero, it is preferred always to use the filter 20, because the relatively high cost of operating a heat sink at such low temperatures makes it advisable to minimize the energy input to the heat sink in every way possible.

Figure 4:
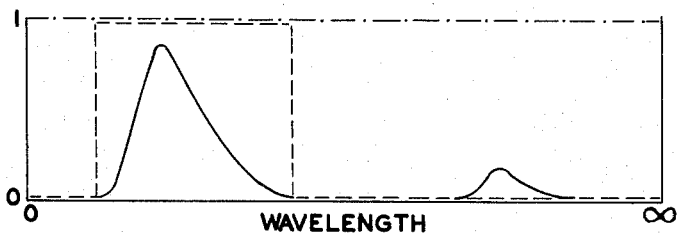
FIG. 4 is a chart showing the approximate spectral distribution of sun light and the idealized emissivity characteristic of one of the heat sinks used in each of the embodiments shown in FIGS. 2 and 3.

The absolute value of the economic gain achievable through the practice of the present invention will depend to a large extent upon the actual temperatures at which the two heat sinks 16 and 18 are operated, and also upon the spectral distribution of the energy radiated by the source 10. If the source 10 radiates primarily in the low energy part of the spectrum, the economic advantage resulting from the practice of the invention will be less than in those instances where the source 10 radiates primarily in the high energy part of the spectrum. In an outer space simulating system, wherein a relatively large portion of the energy to be absorbed and removed consists of direct radiation from a sun simulator, and has a spectral distribution approximately as represented by the curves 31 and 33 shown in FIG. 4, the practice of the invention is of relatively great advantage because sun radiation lies mostly in the relatively high energy part of the spectrum.

In addition, in such a system, consideration must be given to the removal of radiant energy from a test object suspended in the environmental chamber. The total energy given off from an object suspended in outer space in the vicinity of the earth consists primarily of reflected energy. The component due to direct radiation from the body, while at relatively low energy levels, constitutes only a small part of the total. A relatively large part of the total energy has a wave length of about three microns or less, while only a relatively small part has a wave length greater than about three microns, which wave length corresponds to a temperature of about 960° K. The short wave length energy may be absorbed with fully satisfactory efficiency by a heat sink maintained at any desired temperature lower than about 250° K. That portion of the total energy from the object having a wave length greater than about three microns, representing only a small portion of the total may be directed to a heat sink maintained at a temperature close to absolute zero.

An outer space simulating system according to one embodiment of the present invention is schematically illustrated in FIG. 2, wherein an object 30 such as a space vehicle, or model thereof is shown supported within a double walled evacuated chamber 32. A radiation source 34 capable of emitting radiation having a spectral distribution generally similar to the spectral distribution of sun, earth, and moon radiation is mounted exteriorly of the chamber 32 for directing radiant energy through a transparent window 36 into the chamber 32 and upon the test object 30.

The inner wall 38 of the chamber 32 is preferably made of quartz, or similar material, which is highly transparent to energy of wave lengths shorter than about three microns, and absorbs radiation of longer wave length. The inner wall 38 is cooled to a temperature of about 4° K., or lower by any desired means such as, for example, by boiling helium passing through a copper coil 40 wrapped around the wall 38 in thermal contact therewith. The outer wall 42 in the instant example is cooled by any desired means such as a liquid nitrogen refrigeration system (not shown) to a temperature of about 100° K.

The high energy radiation from the chamber 32, having equivalent temperatures of about 960° K. and higher passes relatively readily through the quartz inner wall 38, and is absorbed by the outer wall 42. The relatively low energy radiation, having equivalent temperatures lower than 960° K., or thereabouts, is absorbed by the inner wall 38 and removed from the system by the boiling liquid helium coil 40. Since most of the energy lies in the high energy portion of the spectrum, relatively little load is imposed upon the relatively expensive apparatus required for maintaining the inner wall 38 at its relatively low temperature.

In the construction shown in FIG. 2, it is not readily possible to provide mechanical shielding between the outer wall 42 and the inner wall 38, and the outer wall 42 will therefore radiate energy to the inner wall 38. Such radiation will not represent a large fraction of the total radiation received by the outer wall 42, even if the outer wall approximates a theoretical black body. Nevertheless, because of the extremely high costs entailed in maintaining the inner wall 38 at temperatures close to absolute zero, it is highly desirable from an economic point of view, to minimize the back radiation from the outer wall 42 to the inner wall 38.

This may be done by placing a filter between the outer wall 42 and the inner wall 38, which is opaque to relatively long wave length energy, but transparent to relatively short wave length energy, thereby reducing the emission of low energy radiation from the outer wall 42 toward the inner wall 38. Any desired type of filter may be used. In the illustrated embodiment, the filter takes the form of a multi-layer interference film 44, disposed upon the inner surface of the outer wall 42. The filter is of the so-called dark mirror type, as described in an article by Hass et al. in the Journal of the Optical Society of America, volume 46, pp. 31–35 (January 1956) entitled, "Mirror Coatings for Low Visible and High Infrared Reflectance," and is constructed to have a cut-off characteristic at about three microns, as shown by the dashed line curve 35 in FIG. 4. The interference film 44 appears black with respect to radiation of wave lengths shorter than about three microns, that is, when the film is disposed upon the surface of the wall 42, the surface becomes highly absorptive and non-reflective with respect to radiation of relatively short wave lengths. The interference film 44 is highly reflective at relatively long wave lengths, and serves to minimize the emissivity of the outer wall 42 for radiation of wave lengths greater than about three microns.

An alternative heat sink construction according to the invention is illustrated in FIGURE 3 for use in an outer space simulating chamber. In this chamber, light from a sun-simulating source 50 is directed downwardly through a window 52 in the roof of the chamber upon a multi-faceted reflector 54, which is mounted by any convenient means (not shown) beneath the window 52 and faces upwardly toward the source 50. The multi-faceted reflector 54 scatters the light, and directs it diffusely upwardly into a downwardly facing, parabolic reflector 56, which spans substantially the entire test area within the chamber. The parabolic reflector 56 collimates light received by it from the multifaceted reflector 54, and directs the light generally downwardly into the test region, wherein a test object 58 may be mounted.

A major portion of the energy reflected in generally collimated form from the parabolic reflector 56 passes by the test object 58 toward the floor of the chamber, where it strikes an array of multistage heat sinks 60. Each one of the heat sinks 60 comprises a relatively thin, heat conductive shroud 62, which is maintained at a relatively high temperature. The shrouds 62 are arranged to absorb the relatively low energy radiation and to reflect the relatively high energy radiation toward the relatively thick plates 64. The shrouds 62 are surface treated for preferential reflectance and absorption, and include cylindrically curved portions 66, 68, and 70, which are shaped to direct the downwardly arriving radiation upwardly toward the thick plates 64 for impingement thereon and absorption thereby. The shrouds 62 also include roof portions (not separately designated) covering the relatively heavy plates 64, and shielding the plates 64 from the test object 58, so that, in effect, the test object 58 sees below it only the relatively low temperature shrouds 62, and does not see the relatively high temperature heavy plates 64. Thus, the relatively heavy plates 64 cannot radiate directly toward the test object 58 or otherwise into the test region within the chamber.

The shrouds 62 may be constructed of relatively light gauge heat conductive material such as, for example, sheet aluminum. They absorb only relatively small quantities of energy, and, therefore, need not be heavy. They may be shaped as desired according to generally recognized optical principles to reflect the high temperature energy toward the heavy plates 64. As shown, they are shaped in stepped fashion, leaving relatively large passage space between them to provide direct exit paths for air being exhausted from the interior of the chamber through exhaust ports 72 in the bottom thereof. The shrouds 62 may be supported on cooling pipes 74, and are preferably soldered or brazed to the pipes 74 for good thermal contact therewith.

The heavy plates 64 are relatively short, and may be simply hung upon the relatively high temperature cooling pipes 76 in thermal contact therewith. Preferably, the heavy plates are surface treated to minimize their radiation emission at relatively low energy wave lengths, thereby minimizing the load imposed on the relatively low temperature shrouds 62. The side walls 38 and 42 of the chamber may be cooled as described in connection with the embodiment shown in FIG. 2.

Representative different modified forms of the present invention are illustrated schematically in FIGS. 5 to 9, and will now be briefly described.

FIG. 5 illustrates the use of an optical diffraction grating 80 for separating radiation according to its energy content, and directing the relatively high energy radiation to a first heat sink 82, and the relatively low energy radiation to a second heat sink 84. Any desired means (not shown) may be used for collimating the radiation as it approaches the grating 80.

FIG. 6 illustrates the basic principle of the heat sink array hereinabove described in connection with FIG. 3. The incident radiation is directed by any desired means to a focusing member 86, which is maintained at a relatively low temperature, and which is surface treated in "dark mirror" fashion to absorb relatively low energy radiation and reflect relatively high energy radiation. The member 86 is shaped to direct radiation reflected by it toward a second heat sink 88, which is maintained at a relatively high temperature, and which is preferably surface treated to minimize its emission of relatively low energy radiation.

Figure 7:
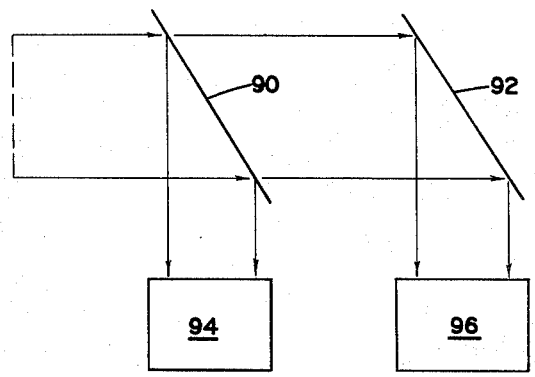
FIG. 7 is a schematic diagram illustrating a third plural heat sink arrangement according to the invention.

FIG. 7 illustrates the use of selective interference type, on so-called thin film filters 90 and 92 for separating the incident radiation into relatively low and high energy portions. The incoming radiation first strikes the first filter 90, which is transparent to relatively high energy radiation and reflective to relatively low energy radiation. The first filter 90 is disposed at an acute angle to the main ray path and deflects the relatively low energy radiation toward a relatively cold heat sink 94. The radiation transmitted through the first filter 90 passes on to the second filter 92, and is reflected thereby toward the relatively high temperature sink 96. The second filter 92 may be made relatively transparent to relatively low energy radiation to minimize back radiation from the second, relatively high temperature sink 96 into the system. This will depend, however, upon further considerations having to do with the construction of the entire system in which the heat sink arrangement is used. In many cases, the second filter 92 may be simply a high reflective surface, without special energy selective characteristics.

Figure 8:
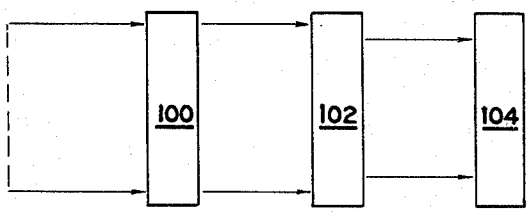
FIG. 8 is a schematic diagram illustrating a fourth heat sink arrangement according to the invention.

The system illustrated in FIG. 8 includes three heat sinks 100, 102, and 104, respectively, which are maintained at different respective temperatures by any desired cooling means (not shown) and which are arranged in series in the radiation path. The first heat sink 100 may be of a material such as quartz, which absorbs relatively low energy radiation and transmits relatively high energy radiation toward the second heat sink 102. The first heat sink 100 is maintained at the lowest temperature of the three. The second heat sink 102 is maintained at an intermediate temperature, warmer than the first heat sink 100 and cooler than the third heat sink 104. It is made of a material such as, for example, glass which has a higher frequency transmission cut-off characteristic than the first heat sink 100. The second heat sink 102 absorbs radiation of an intermediate energy level, that is, at an energy level higher than the level of the energy absorbed by the first heat sink 100. The third heat sink 104 absorbs the relatively highest energy radiation entering the system.

As in the other examples described herein the forwardly facing surfaces of the secondary heat sinks 102 and 104 may be "dark mirror" treated to minimize their emission in the back direction.

Figure 9:
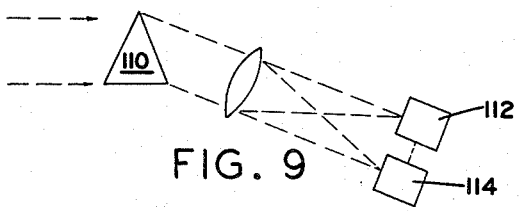
FIG. 9 is a schematic diagram of a fifth heat sink arrangement according to the invention.

The embodiment illustrated in FIG. 9 makes use of a prism 110 for separating the entering radiation and directing it selectively to high and low temperature heat sinks 112 and 114, respectively.

The invention has been illustrated and described in the preceding paragraphs. The following claims define the scope of this invention.

I claim:

1. A plural stage heat sink for absorbing radiant energy from a relatively wide band source thereof comprising a first heat sink, means for maintaining said sink at a relatively low preselected temperature, a second heat sink, means for maintaining said second heat sink at a relatively high preselected temperature, and means for separating radiation from said source according to the energy contents of the various photons thereof and directing relatively low energy photons to said first sink and the relatively high energy photons to said second sink.

2. A plural stage heat sink for absorbing radiant energy from a radiant flux comprising, a first heat sink receiving radiant energy from said radiant flux, means associated with the said first heat sink for maintaining a low preselected temperature of said first heat sink, a second heat sink receiving a preselected portion of the radiant flux, means associated with said second heat sink for maintaining said second heat sink at a relatively high preselected temperature relative to said first heat sink, means diverting the radiant flux according to the energy content of the various photons by directing the relatively low energy photons to said first heat sink and the relatively high energy photons to said second heat sink, means intermediate said first heat sink and said second heat sink for minimizing radiation from the high temperature heat sink toward the low temperature heat sink.

3. A plural stage heat sink for absorbing radiant energy from a source of radiation over a relatively wide band comprising, a high temperature heat sink maintained at a predetermined temperature substantially lower than the major portion of radiation from the source of radiation, means maintaining the predetermined temperature of said high temperature sink, a low temperature heat sink of substantially lower temperature than said high temperature heat sink, means maintaining the low temperature on said low temperature heat sink, means diverting radiant flux from said source of radiation in accordance with the energy content in said radiant flux directing the relatively low energy radiant flux to said low temperature heat sink and the relatively high energy radiant flux to the high temperature heat sink thereby providing means for removing radiant energy from said radiant flux in accordance with the energy content of the various portions of the radiant flux.

4. A plural stage heat sink for absorbing radiant energy from a radiant flux comprising, a high temperature heat sink maintained at a temperature relatively high in relation to the low temperature heat sink and relatively low in relation to the source of radiation, means associated with said high temperature sink for maintaining said high temperature sink at the preselected temperature, a low temperature heat sink maintained at a temperature low relative to the high temperature sink, means associated with the said low temperature sink for maintaining the low temperature, a diffraction grating diverting the radiant flux according to the energy content of the various portions of the radiant flux directing the relatively low energy radiant flux to the low temperature heat sink and the relatively high energy content flux to the high temperature heat sink.

5. A plural stage heat sink for absorbing radiant energy from a radiant flux comprising, a first heat sink, means associated with said first heat sink for maintaining a relatively low preselected temperature, a second heat sink, means associated with said second heat sink for maintaining said second heat sink at a relatively high preselected temperature, a preferential radiant flux reflecting and transmitting means for reflecting the radiant flux having a low energy content to said first heat sink and transmitting the portion of the radiant flux having high energy content through said means, reflector means receiving the radiant flux and directing the radiant flux of high energy content to the relatively high temperature heat sink.

6. A plural stage heat sink for absorbing radiant energy from a radiant flux comprising, a first heat sink, means associated with said first heat sink for maintaining said first heat sink at a relatively low preselected temperature, a preferential reflection and absorption surface on said first heat sink for absorbing the portion of the radiant flux having low energy content, a second heat sink, means associated with said second heat sink for maintaining said second heat sink at a relatively high preselected temperature relative to said first heat sink, said first heat sink absorbing energy from the low energy content radiant flux and said second heat sink absorbing the major portion of radiant energy in the radiant flux.

7. A plural stage heat sink for absorbing radiant energy from a radiant flux comprising, a first heat sink, means associated with said first heat sink for maintaining said sink at a relatively low preselected temperature, a second heat sink, means associated with said second heat sink maintaining said second heat sink at a relatively high preselected temperature relative to said first heat sink, a preferential reflection and transmission means exposed to the radiant flux reflecting the low energy content radiant flux to said first heat sink and transmitting the high energy content radiant flux to said second heat sink.

8. A plural stage heat sink for absorbing radiant energy from a radiant flux comprising a first heat sink, means associated with said first heat sink for maintaining said sink at a relatively low preselected temperature, a second heat sink, means associated with said second heat sink for maintaining said second heat sink at a relatively high preselected temperature relative to said first heat sink, a prism means for dispersing light and separating the radiant flux of low energy content to impinge on said first heat sink and directing the radiant flux of high energy content to impinge on said second heat sink.

9. A plural stage heat sink for absorbing radiant energy from a radiant flux comprising, a first heat sink for absorbing low energy content radiant flux, means associated with said first heat sink for maintaining said sink at a relatively low preselected temperature, flux transmitting means in said first heat sink for transmitting radiant flux of high energy content to a second heat sink, the second heat sink, means associated with said second heat sink for maintaining said second heat sink at a relatively high preselected temperature relative to said first heat sink, said second heat sink absorbing the radiant energy of flux transmitting from said first heat sink, means associated with said second heat sink for preventing radiation to said first heat sink.

10. A plural stage heat sink for absorbing radiant energy from a radiant flux comprising, a first heat sink, a test chamber formed internally of said first heat sink, means associated with said first heat sink for maintaining said heat sink in said test chamber a relatively low preselected temperature, a second heat sink enclosing said first heat sink, means associated with said second heat sink for maintaining said second heat sink at a relatively high preselected temperature relative to said first heat sink, a preferential radiant flux absorbing and transmitting medium on said first heat sink for absorbing the low energy content portion of the radiant flux and transmitting the high radiant energy portion of said radiant flux to said second heat sink, a high energy content radiant flux absorbing means forming said second heat sink for removal of high energy content radiant flux at a substantially higher temperature than the energy of said low temperature heat sink.

11. A plural stage heat sink for absorbing radiant energy from radiant flux comprising, a first heat sink, means associated with said first heat sink maintaining a relatively low preselected temperature, a preferential flux transmitting medium forming said first heat sink for absorbing radiant energy of low energy content and transmitting the high energy content radiant flux through said first heat sink, a second heat sink, means associated with said second heat sink for maintaining said second heat sink at a relatively high preselected temperature relative to said first heat sink, an absorbing material forming said second heat sink for absorbing the high energy content radiant flux transmitted from said first heat sink.

12. A plural stage heat sink for absorbing radiant energy from a radiant flux comprising, means forming a test chamber, means directing a radiant flux into said test chamber, a first heat sink exposed to direct radiation of said radiant flux maintained at a predetermined low temperature, means maintaining said predetermined temperature of said heat sink, a second heat sink in said test chamber exposed to reflected radiant flux maintained at a predetermined relatively high temperature, means associated with said second heat sink for maintaining said preselected high temperature, a preferential reflection and absorption means on the surface of said first heat sink exposed to direct radiation of said radiant flux for absorbing a portion of the radiant flux having low energy content and reflecting the portion of the radiant flux having high energy content for impingement on said second heat sink.

13. A plural stage heat sink for absorbing radiant energy from a radiant flux comprising, means forming a test chamber, means for directing a radiant flux into said test chamber, a shroud means in the path of direct radiation of said radiant flux maintained at a predetermined low temperature, means associated with said shroud means for maintaining said predetermined low temperature, a preferential reflection and absorption means covering the exposed surface of said shroud means for permitting absorption of the portion of radiant flux having low energy content and reflecting the portion of radiant flux having high energy content, a second shroud means shielded from direct radiation by said first shroud means, means associated with said second shroud means for maintaining said predetermined relatively high temperature, an absorbing surface on said second shroud means for absorbing the portion of radiant flux having a high energy content, said first shroud means shielding said second shroud means and preventing emission radiating into said test chamber.

14. A plural stage heat sink for absorbing radiant energy from a radiant flux comprising, means forming a test chamber, means directing a radiant flux into said test chamber, a heat sink in said test chamber including a first preferential absorption and light transmitting medium for absorbing the portion of radiant flux having low energy content, means associated with said preferential absorption and reflecting medium for maintaining a predetermined low temperature, a second heat sink, means associated with said second heat sink for maintaining a predetermined high temperature relative to said first heat sink, a surface on said second heat sink reflecting the low energy portions of radiant flux and absorbing the high energy portion of the radiant flux, a first shroud exposed to direct radiation of said radiant flux, a preferential reflection and absorption means on said first shroud means for absorbing the portion of radiant flux having low energy content and reflecting the portion of radiant flux having high energy content, means for maintaining a predetermined low temperature of said first shroud means, a second shroud means shielded by said first shroud means, means for maintaining a predetermined relatively high temperature of said second shroud means relative to said first shroud means, a preferential reflection and absorption means of said second shroud means for reflecting low energy portion of radiant flux and absorbing the high energy portion of the radiant flux.

References Cited by the Examiner
UNITED STATES PATENTS

| | | | |
|---|---|---|---|
| 2,816,232 | 12/57 | Burstein | 250—83.3 |
| 2,848,626 | 8/58 | Brackmann | 250—83.3 |
| 2,967,961 | 1/61 | Heil | 250—83.3 |
| 2,980,763 | 4/61 | Lasser | 250—83.3 |
| 3,031,576 | 4/62 | Loy | 250—83.3 |

RALPH G. NILSON, *Primary Examiner.*